(12) United States Patent
Funayama et al.

(10) Patent No.: US 10,603,832 B2
(45) Date of Patent: Mar. 31, 2020

(54) DIE WITH ALIGNING MECHANISM, AND MANUFACTURING DEVICE AND METHOD FOR ENAMELED WIRE

(71) Applicant: HITACHI METALS, LTD., Tokyo (JP)

(72) Inventors: Yasuhiro Funayama, Tokyo (JP); Junji Ishihara, Tokyo (JP); Shinsuke Miyachi, Tokyo (JP); Takayoshi Nishimura, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/892,559

(22) Filed: Feb. 9, 2018

(65) Prior Publication Data
US 2018/0345560 A1   Dec. 6, 2018

(30) Foreign Application Priority Data
May 30, 2017   (JP) ................. 2017-107028

(51) Int. Cl.
| | |
|---|---|
| *H01B 13/00* | (2006.01) |
| *B29C 48/30* | (2019.01) |
| *H01B 13/06* | (2006.01) |
| *B29C 48/154* | (2019.01) |
| *B29C 48/34* | (2019.01) |
| *B29C 48/156* | (2019.01) |
| *B29K 705/00* | (2006.01) |

(Continued)

(52) U.S. Cl.
CPC ............ *B29C 48/30* (2019.02); *B29C 48/154* (2019.02); *B29C 48/156* (2019.02); *B29C 48/34* (2019.02); *H01B 13/065* (2013.01); *B05C 3/12* (2013.01); *B05C 3/15* (2013.01); *B05C 5/0241* (2013.01); *B05C 11/021* (2013.01); *B05D 1/26* (2013.01); *B05D 1/265* (2013.01); *B05D 1/40* (2013.01); *B05D 7/20* (2013.01); *B29C 48/302* (2019.02); *B29K 2705/00* (2013.01); *H01B 13/16* (2013.01); *Y10S 118/18* (2013.01); *Y10S 118/22* (2013.01)

(58) Field of Classification Search
USPC ........................... 427/117; 425/113; 118/428
See application file for complete search history.

(56) References Cited

U.S. PATENT DOCUMENTS

| | | | | |
|---|---|---|---|---|
| 3,752,614 A | * | 8/1973 | Bremer | ............... B29C 48/30 425/113 |
| 4,174,935 A | * | 11/1979 | Driskill | ............... B29C 48/30 425/113 |

(Continued)

FOREIGN PATENT DOCUMENTS

| | | | | |
|---|---|---|---|---|
| JP | 2000169192 | * | 6/2000 | ............. C03C 25/12 |
| JP | 2014-144384 A | | 8/2014 | |

*Primary Examiner* — Brian K Talbot
(74) *Attorney, Agent, or Firm* — Foley & Lardner LLP

(57) ABSTRACT

A die with alignment mechanism includes a die including a through-hole through which a traveling wire travels, a bearing member for rotationally moving the die in a circumferential direction of the traveling wire, and a movable member that moves the die so that a central axis of the through-hole is aligned with a travel direction of the traveling wire without inhibiting the rotational movement of the die produced by the bearing member when the travel direction changes in a direction orthogonal to the travel direction.

5 Claims, 5 Drawing Sheets

(51) Int. Cl.
*B05D 7/20* (2006.01)
*B05C 5/02* (2006.01)
*B05D 1/40* (2006.01)
*B05C 11/02* (2006.01)
*B05D 1/26* (2006.01)
*B05C 3/15* (2006.01)
*H01B 13/16* (2006.01)
*B05C 3/12* (2006.01)

(56) References Cited

U.S. PATENT DOCUMENTS

| | | | | |
|---|---|---|---|---|
| 5,338,171 | A * | 8/1994 | Hayakawa | B29C 45/1747 |
| | | | | 425/138 |
| 5,674,318 | A * | 10/1997 | Milliman | B05C 3/12 |
| | | | | 118/405 |
| 9,111,664 | B2 * | 8/2015 | Goto | H01B 13/065 |
| 2008/0038392 | A1 * | 2/2008 | Druet | B29D 30/38 |
| | | | | 425/113 |
| 2012/0164315 | A1 * | 6/2012 | Goto | B05C 1/04 |
| | | | | 427/117 |

* cited by examiner

DIE WITH ALIGNING MECHANISM, AND MANUFACTURING DEVICE AND METHOD FOR ENAMELED WIRE

The present application is based on Japanese patent application No. 2017-107028 filed on May 30, 2017, the entire contents of which are incorporated herein by reference.

BACKGROUND OF THE INVENTION

1. Field of the Invention

The invention relates to a die with alignment mechanism, an enameled wire manufacturing equipment, and an enameled wire manufacturing method.

2. Description of the Related Art

When manufacturing an enameled wire, a varnish layer is formed by applying a coating material such as insulating coating material around a metal wire rod (traveling wire) formed of, e.g., copper or aluminum (see, e.g., JP 2014/144384 A). A coating material applicator used to form such varnish layer has an applicator portion for applying a coating material to a surface of the traveling wire and a die with a through-hole for passing the traveling wire through. In this coating material applicator, when the traveling wire with a coating material applied by the applicator portion passes through the through-hole, an excessive coating material applied to the surface of the traveling wire is removed and a thickness of the coating material is thereby adjusted.

SUMMARY OF THE INVENTION

To achieve an even deposition of the coating material applied around the traveling wire in a horizontal-type equipment, it is preferable that the traveling wire pass through the center of the through-hole of the die. During travel of the traveling wire, however, the traveling wire may, e.g., vibrate or twist or, in the horizontal-type equipment, become a catenary shape under its own weight. Due to such vibration, twist or catenary shape of the traveling wire, it is difficult to feed the traveling wire so as to pass through the center of the through-hole of the die.

Also, prior to the process of forming a varnish layer by applying a coating material around the traveling wire, a process of forming the shape and diameter of the traveling wire is performed by a wire drawing machine or a rolling mill. When such process of forming the shape and diameter of the traveling wire and the process of forming a varnish layer by applying a coating material are performed in the same production line, vibration or twist, etc., of the traveling wire sometimes occurs due to a difference in the travel speed, etc., of the traveling wire between the processes, resulting in that the traveling wire is less likely to pass through the center of the through-hole of the die.

It is an object of the invention to provide a die with alignment mechanism that allows a traveling wire to easily pass through a center of a through-hole of the die in a horizontal-type equipment, as well as an enameled wire manufacturing equipment and an enameled wire manufacturing method which use the die with alignment mechanism.

According to an embodiment of the invention, provided are a die with alignment mechanism, an enameled wire manufacturing equipment and an enameled wire manufacturing method which use the die with alignment mechanism as defined below. According to one aspect of the invention there is provided a die with alignment mechanism, comprising:

a die comprising a through-hole through which a traveling wire travels;

a bearing member for rotationally moving the die in a circumferential direction of the traveling wire; and a movable member that moves the die so that a central axis of the through-hole is aligned with a travel direction of the traveling wire without inhibiting the rotational movement of the die produced by the bearing member when the travel direction changes in a direction orthogonal to the travel direction.

The According to another aspect of the invention there is provided a die with alignment mechanism, wherein the movable member comprises a main body and a movable portion, the main body comprising a recessed portion for fitting the bearing member and a hole portion provided on a bottom surface of the recessed portion to allow a portion of the die to penetrate through, and the movable portion being arranged on the forward side of the main body in the travel direction to move the main body in a direction orthogonal to the travel direction of the traveling wire.

According to another aspect of the invention there is provided a die with alignment mechanism, wherein the die has one end face and another end face opposite thereto and comprises a flange portion including the one end face and a stem portion including the other end face and extending from the flange portion, and the though-hole is provided from the one end face to the other end face.

According to another aspect of the invention there is provided a die with alignment mechanism, wherein the bearing member comprises a bearing portion for rotationally moving the die in the circumferential direction of the traveling wire and has an annular outer shape.

According to another aspect of the invention there is provided a die with alignment mechanism, further comprising a receiving member that is arranged between the movable member and the die and comprises a raised portion protruding in the travel direction of the traveling wire and abutting against the bearing member.

According to another aspect of the invention there is provided a die with alignment mechanism, further comprising a guide member that is arranged to be in contact with the movable member and comprises a guide surface for guiding the movable member.

According to another aspect of the invention there is provided a die with alignment mechanism, wherein the movable portion of the movable member comprises rollers.

According to another aspect of the invention there is provided a die with alignment mechanism, wherein the movable portion of the movable member comprises ball rollers.

According to another aspect of the invention there is provided a die with alignment mechanism, wherein the receiving member is configured that the raised portion is provided on the base that is arranged adjacent to the flange portion of the die.

According to another aspect of the invention there is provided a die with alignment mechanism, wherein the receiving member is configured that the base has a larger outer diameter than the flange portion.

According to another aspect of the invention there is provided a die with alignment mechanism, wherein the guide member comprises an opening.

According to another aspect of the invention there is provided an enameled wire manufacturing equipment, comprising:

a coating application mechanism for applying a coating material around a traveling wire; and a die with alignment mechanism that is arranged on the forward side of the coating application mechanism and comprises a die comprising a through-hole through which a traveling wire travels, a bearing member for rotationally moving the die in a circumferential direction of the traveling wire, and a movable member that moves the die so that a central axis of the through-hole is aligned with a travel direction of the traveling wire without inhibiting the rotational movement of the die produced by the bearing member when the travel direction changes in a direction orthogonal to the travel direction.

According to another aspect of the invention there is provided an enameled wire manufacturing method, comprising:

applying a coating material around a traveling wire; and adjusting a thickness of the coating material applied around the traveling wire by using a die with alignment mechanism that comprises a die comprising a through-hole through which a traveling wire travels, a bearing member for rotationally moving the die in a circumferential direction of the traveling wire, and a movable member that moves the die so that a central axis of the through-hole is aligned with a travel direction of the traveling wire without inhibiting the rotational movement of the die produced by the bearing member when the travel direction changes in a direction orthogonal to the travel direction.

Effects of the Invention

According to an embodiment of the invention, a die with alignment mechanism can be provided that allows a traveling wire to easily pass through a center of a through-hole of the die in a horizontal-type equipment, as well as an enameled wire manufacturing equipment and an enameled wire manufacturing method which use the die with alignment mechanism.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

First Embodiment

Figure 1A:
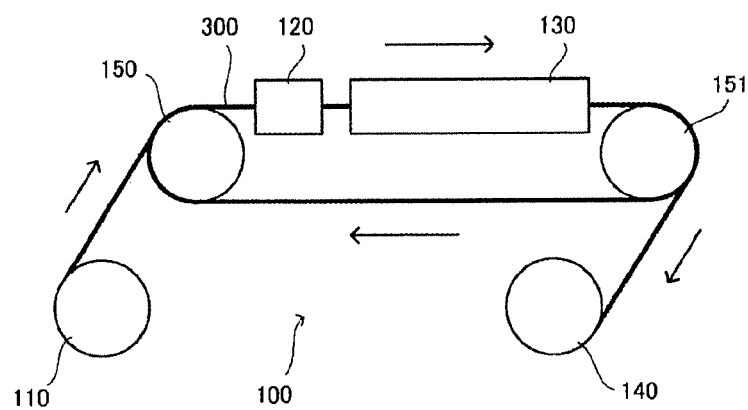
FIGS. 1A and 1B are schematic diagrams illustrating a general configuration of an enameled wire manufacturing equipment in the first (or second) embodiment of the present invention.
Figure 1B:
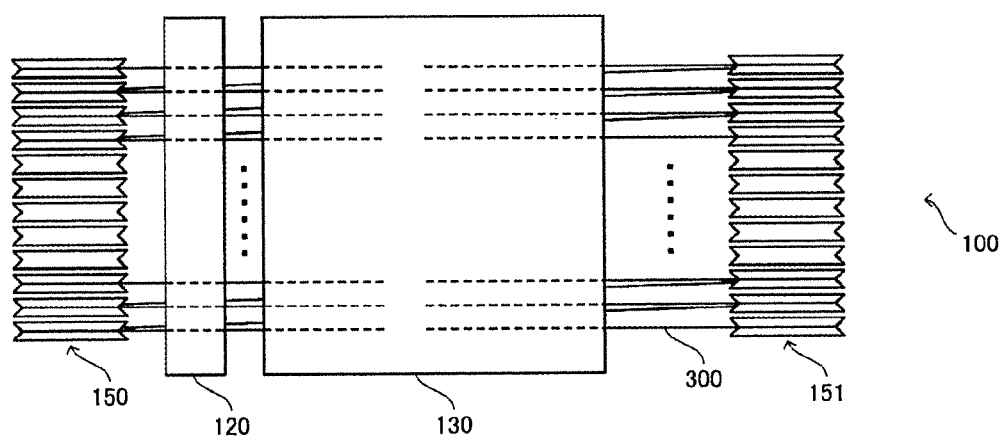

An enameled wire manufacturing equipment (insulated wire manufacturing equipment, covered wire manufacturing equipment) 100 in the first embodiment of the invention will be described. In reference to FIGS. 1A and 1B, the general configuration of the enameled wire manufacturing equipment 100 will be firstly described together with a general flow of an enameled wire manufacturing method. FIGS. 1A and 1B are schematic diagrams illustrating a general configuration of the enameled wire manufacturing equipment 100.

The equipment described in the first embodiment is a horizontal-type enameled wire manufacturing equipment configured to apply a coating material to a substantially horizontally traveling wire, and is not a vertical-type enameled wire manufacturing equipment configured to apply a coating material to a substantially vertically traveling wire. Hereinafter, the horizontal-type enameled wire manufacturing equipment is sometimes referred to as "a horizontal-type equipment".

The enameled wire manufacturing equipment 100 has a feeder 110, a coating application unit 120, a curing furnace 130, a winder 140, and pulleys 150 and 151. A traveling wire 300 comprising a conductor formed of a metal rod is fed from the feeder 110. In FIGS. 1 to 4, the travel direction of the traveling wire 300 is indicated by arrows. In addition, in the first embodiment, a right-left direction on the paper of FIG. 1 is a horizontal direction.

Figure 5A:
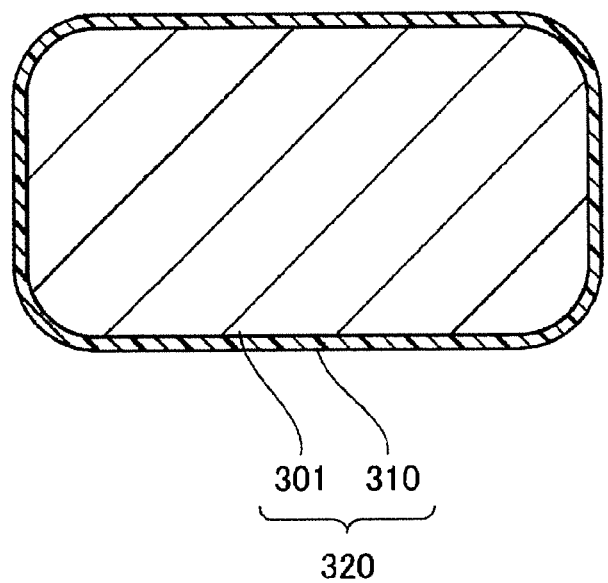
FIGS. 5A and 5B are cross sectional views showing configurations of enameled wires.
Figure 5B:
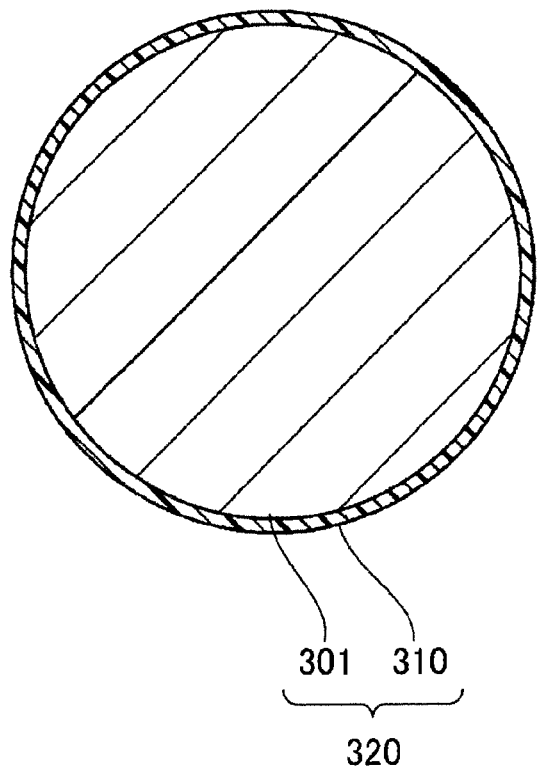

A known metal wire rod such as copper wire or aluminum wire is used as a conductor of the traveling wire 300. FIGS. 5A and 5B show cross sections of example enameled wires obtained in the first embodiment, wherein FIG. 5A shows an example enameled wire (insulated wire, covered wire) 320 having an insulation cover 310 around a rectangular conductor 301 and FIG. 5B shows an example enameled wire (insulated wire, covered wire) 320 formed by providing the insulation cover 310 around a round conductor 301.

The traveling wire 300 fed from the feeder 110 is conveyed into the coating application unit 120. Inside the coating application unit 120, an insulating coating material is applied to the outer surface of the traveling wire 300, and the thickness and shape of the applied insulating coating material are adjusted to a predetermined thickness and shape by a die with alignment mechanism (described later). The coating material used here can be appropriately selected from enamel coating materials containing resins formed of polyimide, polyamide-imide and polyester-imide, etc.

The traveling wire 300 with the coating material applied in the coating application unit 120 is conveyed into the curing furnace 130. The coating material applied to the outer surface of the traveling wire 300 in the coating application unit 120 is baked (cured) by heating in the curing furnace 130 and an insulating cover is thereby formed around the traveling wire 300.

The traveling wire 300 is guided by the pulleys 150 and 151 and repeatedly passes through the coating application unit 120 and the curing furnace 130. The coating material is repeatedly applied and baked until the total thickness of the insulation cover reaches a predetermined thickness. In each cycle, the traveling wire 300 passes a position next to the position in the previous cycle (passes a position adjacent in the vertical direction on the paper) in the coating application unit 120 and the curing furnace 130 as shown in FIG. 1B, so application and baking of the coating material are repeatedly performed.

The traveling wire 300 on which the insulation cover 310 with a predetermined thickness is formed is taken up on the winder 140. The enameled wire (insulated wire, covered wire) 320 is thereby manufactured.

If required, the enameled wire manufacturing equipment 100 may be provided with other processing units such as a rolling mill, a wire drawing machine or an annealing furnace between the feeder 110 and the coating application unit 120 on the same production line. The enameled wire 320 may be manufactured by, e.g., shaping the traveling wire 300 fed from the feeder 110 by a rolling mill or a wire drawing machine from a round wire into a rectangular wire, subsequently annealing the shaped traveling wire 300 in an annealing furnace, and then repeatedly applying and baking a coating material as described above.

Coating Application Unit

Figure 2:
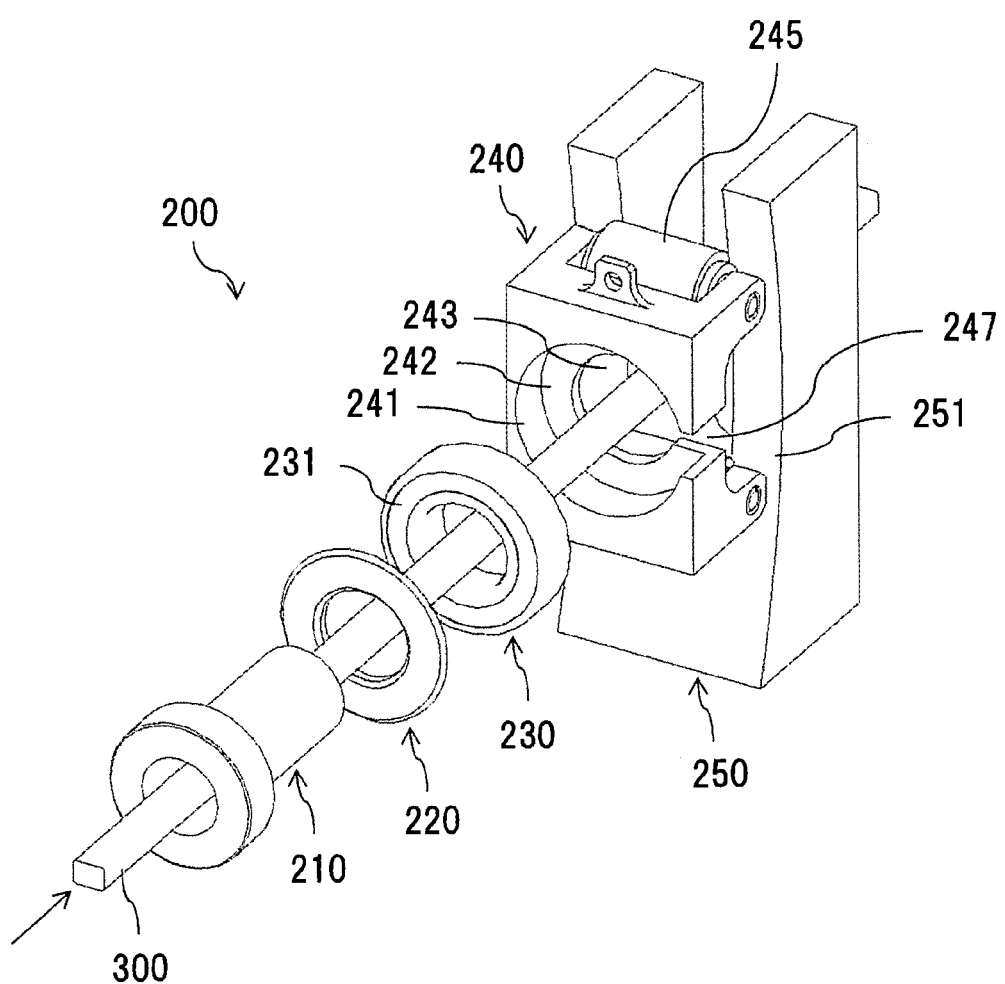
FIG. 2 is an exploded perspective view showing a configuration of a die with alignment mechanism mounted on the enameled wire manufacturing equipment in the first embodiment.
Figure 3:
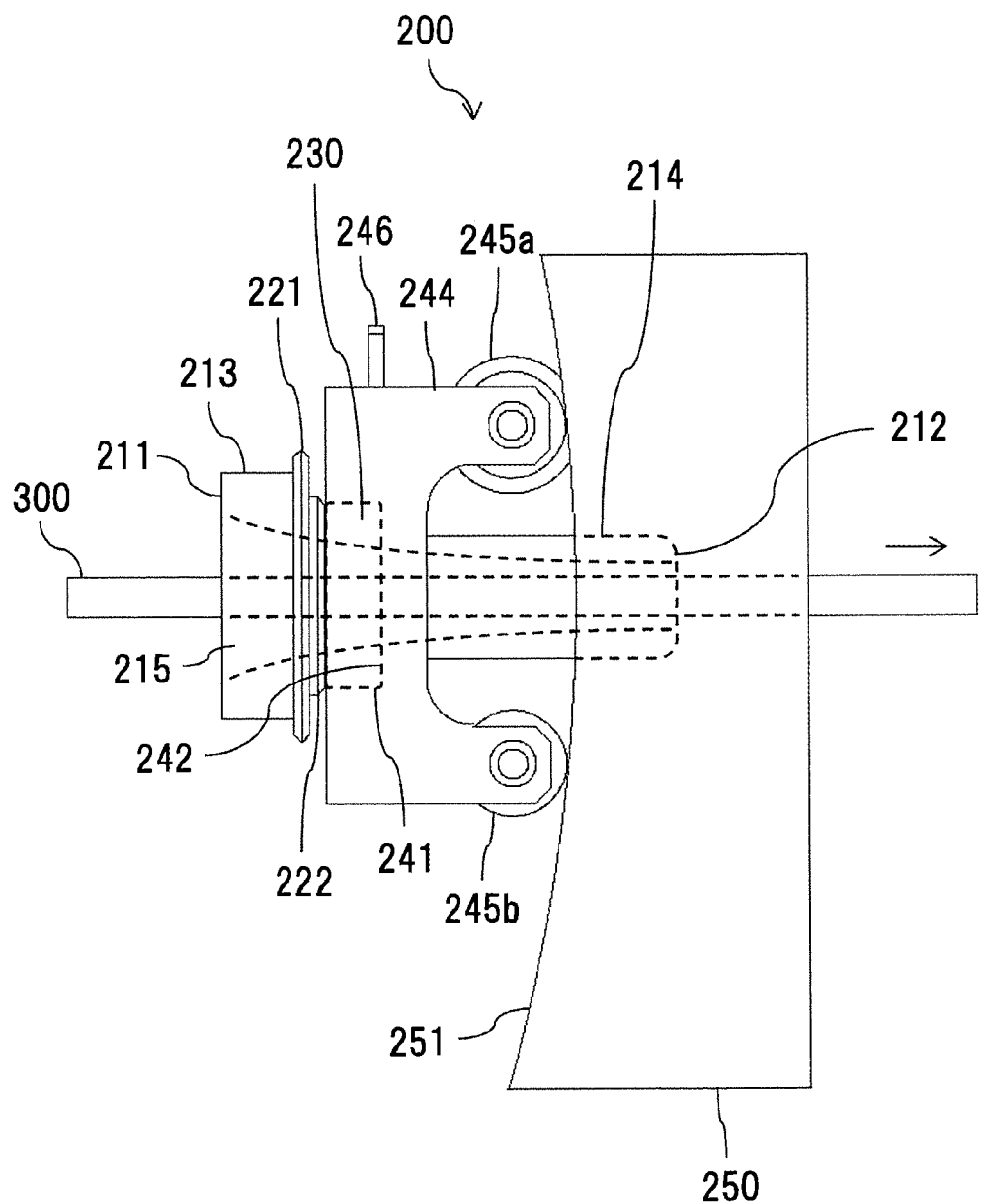
FIG. 3 is a side view showing the configuration of the die with alignment mechanism mounted on the enameled wire manufacturing equipment in the first embodiment.

Next, the coating application unit 120 will be further described. FIG. 2 is an exploded perspective view showing a configuration of a die with alignment mechanism 200 mounted on the coating application unit 120 of the enameled wire manufacturing equipment 100. FIG. 3 is a side view showing the configuration of the die with alignment mechanism 200.

The coating application unit 120 shown in FIG. 1 has a coating application mechanism and the die with alignment mechanism 200 shown in FIG. 2 in this order along the travel direction of the traveling wire 300. The coating application mechanism has a coating material tank and an applicator roll for applying a coating material to the outer surface of the traveling wire 300. The coating material tank contains a coating material. The applicator roll is arranged inside the coating material tank so as to be partially dipped in the coating material. The traveling wire 300 travels in a state of being fitted in a groove provided on the outer peripheral portion of the applicator roll. The applicator roll rotates in synchronization with the travel of the traveling wire 300, and the coating material attached in the groove of the applicator roll is applied to the outer surface of the traveling wire 300.

The die with alignment mechanism 200 shown in FIG. 2 is arranged on the forward side of the applicator roll in the travel direction of the traveling wire 300 (hereinafter, sometimes simply referred to as "forward side" or "downstream side"). In the first embodiment, the applicator roll is a roller member in contact with the traveling wire 300 just before the die with alignment mechanism 200.

The die with alignment mechanism 200 is provided with a die 210 having a through-hole 215 through which the traveling wire 300 travels, a bearing member 230 for rotationally moving the die 210 in a circumferential direction of the traveling wire 300, and a movable member 240 which moves the die 210 so that a central axis of the through-hole 215 is aligned with the travel direction of the traveling wire 300 without inhibiting the rotational movement of the die 210 produced by the bearing member 230 when the travel direction changes in a direction orthogonal to the travel direction.

The die with alignment mechanism 200 has, e.g., the die 210, a receiving member 220, the bearing member 230, the movable member 240 and a guide member 250, as shown in FIG. 2. The die with alignment mechanism 200 can be also regarded as a die mechanism with an alignment function.

The die 210 has an end face 211 and another end face 212 opposite thereto, a flange portion 213 including the end face 211, a stem portion 214 including the other end face 212 and extending forward from the flange portion 213 in the travel direction, and the through-hole 215 through which the traveling wire 300 travels from the end face 211 to the other end face 212. The die 210 is configured so that an excessive coating material applied to the traveling wire 300 (a portion of the coating material) is removed (scraped off) by passage of the traveling wire 300 through the through-hole 215, resulting in that the thickness and shape of the coating material applied around the traveling wire are adjusted. The coating material scraped by the die 210 is recovered into the coating material tank. The shape of the through-hole 215 can be appropriately adjusted depending on, e.g., the shape of the traveling wire 300 or a thickness of a coating film to be formed by one application.

Due to travel of the traveling wire 300, an aligning force acts on the traveling wire 300 to pass through the center of the through-hole 215 of the die 210 (a force causing the traveling wire 300 to travel so that the central axis of the traveling wire 300 at a portion passing through the through-hole 215 coincides with the central axis of the through-hole 215).

Therefore, in an ideal case, the traveling wire 300 passes through the center of the through-hole 215 of the die 210 due to the aligning force and the coating material is uniformly applied to the outer surface of the traveling wire 300. In practice, however, there are some factors which inhibits the aligning force, as described below.

Firstly, change (misalignment) of the actual travel direction with respect to the (ideal) feeding direction of the traveling wire 300, i.e., with respect to the horizontal direction inhibits the aligning force.

The traveling wire 300 vibrates as the traveling wire 300 travels, and the travel direction of the traveling wire 300 deviates. Vibration within a vertical plane as a plane orthogonal to the axial direction of the applicator roll, i.e., deviation in a vertical direction orthogonal to the travel direction of the traveling wire 300 is particularly large.

In addition, in the horizontal-type equipment, the traveling wire 300 droops under its own weight and curves in a catenary shape on the forward side of a point where the traveling wire 300 leaves the applicator roll (the foremost edge of the contact portion between the traveling wire 300 and the applicator roll). Also due to such curve, the travel direction of the traveling wire 300 deviates downwardly from a certain horizontal direction.

In addition, the travel direction of the traveling wire 300 also vibrates within a horizontal plane, i.e., deviates in a horizontal direction. Furthermore, the travel direction is displaced in a horizontal direction (parallel displacement).

Secondly, rotational movement (twist) of the traveling wire 300 along with its travel also inhibits the aligning force.

Thirdly, in the horizontal-type device, an upper portion of a space between the traveling wire 300 and the inner surface of the through-hole 215 is sometimes squashed by a weight of the die 210. As such, the aligning force is also inhibited by the weight of the die 210.

If the die 210 is fixed to the same position and orientation in a state in which the aligning force is inhibited by the first factor (change of the travel direction) or the second factor (rotational movement of the traveling wire), the traveling wire 300 does not pass through the center of the through-hole 215 and it is thus not possible to uniformly apply a coating material to the outer surface of the traveling wire 300. In the horizontal-type equipment, vibration, twist and catenary shape of the traveling wire 300 occur and prevent uniform application of the coating material to the outer surface of the traveling wire 300 due largely to the first and second factors.

Also in a state in which the aligning force is inhibited by the third factor (the weight of the die 210), the traveling wire 300 sometimes does not pass through the center of the through-hole 215 and it is not possible to uniformly apply the coating material to the outer surface of the traveling wire 300.

It was found that since the die with alignment mechanism 200 is used to address the first and second factors in the enameled wire manufacturing equipment 100 of the first embodiment, the central axis of the through-hole 215 can be aligned with the travel direction of the traveling wire 300 without inhibiting the rotational movement of the die 210 in the circumferential direction and the die 210 can follow the change in the travel direction of the traveling wire 300 or the rotational movement so that the aligning force is less likely to be inhibited, when the travel direction of the traveling wire 300 changes in a direction orthogonal to the travel direction or the traveling wire 300 twists in the circumferential direction. As a result, in the enameled wire manufacturing equipment 100, even when vibration, twist or catenary shape of the traveling wire 300 occurs, the traveling wire 300 can pass through the center of the through-hole 215 of the die 210 (it is possible to feed the traveling wire 300 so that misalignment between the central axis of the traveling wire 300 and the central axis of the through-hole 215 is reduced at least as compared to when the position and orientation of the die 210 are fixed and the die 210 is not aligned).

In addition, in the enameled wire manufacturing equipment 100 of the first embodiment, the aligning force is less likely to be inhibited by the third factor since misalignment between the central axis of the traveling wire and the central axis of the through-hole 215 can be reduced by hanging the die with alignment mechanism 200 in such a manner that the weight of the die with alignment mechanism 200 is cancelled.

The receiving member 220 has a base 221 arranged adjacent to the flange portion 213 of the die 210, and a raised portion 222 which is arranged on the base 221 and protrudes on the forward side in the travel direction of the traveling wire 300. In other words, the receiving member 220 is arranged so that the base 221 is in contact with the flange portion 213 of the die 210. The receiving member 220 has an annular outer shape such as ring shape and is provided with a hole at the center for allowing the stem portion 214 of the die 210 to penetrate through. The hole preferably has such an outer diameter that, e.g., the inner surface of the hole can be in contact with the surface of the stem portion 214. By having the hole with such outer diameter, the receiving member 220 can be held by the die 210 in a state in which the stem portion 214 penetrates through the hole of the receiving member 220. Therefore, when the traveling wire 300 rotationally moves in the circumferential direction, the receiving member 220 and the die 210 can follow the rotational movement of the traveling wire 300 while integrally moving together.

The receiving member 220 is preferably configured such that the outer diameter of the base 221 is larger than the outer diameter of the flange portion 213 of the die 210. An excessive coating material applied to the outer surface of the traveling wire 300 is removed when the traveling wire 300 passes through the through-hole 215 of the die 210. Since the base 221 of the receiving member 220 has a larger outer diameter than the flange portion 213 of the die 210, the excessive coating material removed by the die 210 can be prevented from flowing from the end face 211 side of the die 210 into the bearing member 230 (described later). Thus, the receiving member 220 can prevent such a phenomenon that the excessive coating material removed from the outer surface of the traveling wire 300 by the die 210 is attached to the bearing member 230 and the attached coating material inhibits rotational movement of the bearing member 230. As a result, in the die with alignment mechanism 200, it is possible to effectively change the position and orientation of the die 210 to follow the rotational movement of the traveling wire 300 (i.e., twist of the traveling wire 300).

The receiving member 220 has the raised portion 222 which protrudes on the forward side in the travel direction of the traveling wire 300. Since the raised portion 222 is arranged to be in contact with a bearing portion 231 of the bearing member 230 (described later), a rotational force produced by rotational movement of the bearing portion 231 in the circumferential direction of the traveling wire 300 can be transferred to the die 210 via the receiving member 220. Therefore, in the die with alignment mechanism 200, it is possible to change the position and orientation of the die 210 so that the die 210 follows the rotational movement of the traveling wire 300 in the circumferential direction of the traveling wire 300.

The raised portion 222 is preferably configured so that the outer diameter of a traverse section at a portion in contact with the bearing portion 231 has such a size that the raised portion 222 can contact with the bearing portion 231. In other words, in view of obtaining the above-described functions, the raised portion 222 is preferably configured that the traverse section has a shape (e.g., an annular shape) allowing for contact with the bearing portion 231.

The bearing member 230 has the bearing portion 231 which is arranged adjacent to the raised portion 222 of the receiving member 220 and rotationally moves the die 210 in the circumferential direction of the traveling wire 300. That is, the bearing member 230 is fitted to a recessed portion 241 provided on the movable member 240 (described later) in a state in which the bearing portion 231 is in contact with the raised portion 222 of the receiving member 220. The bearing portion 231 has rolling elements (balls), and inner and outer races which are arranged to face each other while sandwiching the rolling elements. Specifically, it is possible to use, e.g., a radial bearing or an axial bearing, etc. The bearing portion 231 rotates in the circumferential direction of the traveling wire 300, and the bearing member 230 thus can rotationally moves the die 210 in the circumferential direction so that the die 210 follows twist of the traveling wire 300 in the circumferential direction.

The bearing member 230 has an annular outer shape such as ring shape and is provided with a hole at the center for allowing the stem portion 214 of the die 210 to penetrate through. The hole preferably has such an outer diameter that, e.g., the inner surface of the hole can be in contact with the surface of the stem portion 214. By having the hole with such outer diameter, the bearing member 230 can be held by the die 210 in a state in which the stem portion 214 penetrates through the hole of the bearing member 230.

The movable member 240 has a main body 244 and a movable portion 245. The main body 244 has the recessed portion 241 which is formed on a surface facing the flange portion 213 of the die 210 as well as the receiving member 220 and receives the bearing member 230 fitted thereto, and a hole portion 243 which is provided on a bottom surface 242 of the recessed portion 241 and allows the stem portion 214 to penetrate through. The movable portion 245 is arranged on a side of the main body 244 in the travel direction (on the forward side with respect to the surface on which the recessed portion 241 is provided) and moves the main body 244 in a direction orthogonal to the travel direction of the traveling wire 300.

The bearing member 230 is fitted to the recessed portion 241 of the movable member 240. Thus, the die 210 is held in a state in which the stem portion 214 penetrates through all the receiving member 220, the bearing member 230 and the movable member 240. In other words, the die 210, the receiving member 220, the bearing member 230 and the movable member 240 are connected and integrated into a die with alignment mechanism. The die 210, the receiving member 220, the bearing member 230 and the movable member 240 are preferably, arranged concentrically. In addition, a notched portion 247 with an opening larger than the diameter or thickness of the traveling wire 300 is preferably provided on the movable member 240 as shown in FIG. 2 to facilitate work of fitting the die 210, the receiving member 220 and the bearing member 230 and work of arranging the traveling wire 300 through the movable member 240.

Since the bearing member 230 is fitted to the recessed portion 241 of the main body 244 and the movable portion 245 is arranged separately from the bearing member 230, the movable member 240 can move the die 210 so that the central axis of the through-hole 215 is aligned with the travel direction of the traveling wire 300 without inhibiting the rotational movement of the die 210 when the travel direction changes in a direction orthogonal to the travel direction.

The guide member 250 has a guide surface 251 which is arranged in contact with the movable portion 245 of the movable member 240 and guides the movable member 240 so that the die 210 can move along with the change in the travel direction of the traveling wire 300. The guide member 250 is fixedly arranged on the forward side of the movable member 240. The guide member 250 also has an opening which is arranged along the travel direction and penetrates from the guide surface 251 to a surface opposite to the guide surface 251, and the opening has a substantially U-shaped cross section. The traveling wire 300 inserted through the die 210 travels through the opening of the guide member 250 and is then fed to the curing furnace 130 for the next process. The guide member 250 can be formed by, e.g., machining a metal material such as iron or SUS. Since the guide member 250 has a substantially U cross-sectional shape, the die 210 can be easily placed through the opening.

The movable portion 245 of the movable member 240 is preferably constructed from rollers. The movable portion 245 is composed of, e.g., two different rollers 245a and 245b which are aligned vertically as shown in FIG. 3. The die 210 is arranged so that the stem portion 214 is placed between the rollers 245a and 245b and the other end face 212 of the stem portion 214 is located inside the opening of the guide member 250.

The roller 245a is composed of a columnar roller main body and a surface layer portion having a smaller width than the roller main body and arranged around the roller main body. The width of the surface layer portion of the roller 245a is equal to the width of the opening provided on the guide member 250, and the width of the roller main body of the roller 245a is greater than the width of the opening of the guide member 250. The movable member 240 abuts against the guide member 250 in a state that the surface layer portion of the roller 245a is fitted to the opening of the guide member 250 and the roller main body of the roller 245a is in contact with the guide surface 251 of the guide member 250. Meanwhile, the roller 245b may be formed of only a roller main body to be in contact with the guide surface 251, or may have the same structure as the roller 245a.

In the die with alignment mechanism 200, since the movable member 240 having such movable portion 245 abuts against the guide member 250, the position and orientation of the die 210 can be changed to follow the change of the travel direction of the traveling wire 300 while preventing the movable member 240 from separating from the guide member 250 when the traveling wire 300 deviates in a vertical direction orthogonal to the travel direction of the traveling wire 300 or when the traveling wire 300 droops under its own weight and curves in a catenary shape, and the aligning force is thus less likely to be inhibited. As a result, the die with alignment mechanism 200 can performs alignment so that the traveling wire 300 passes through the center of the through-hole 215 of the die 210.

Since the movable member 240 abuts against the guide surface 251 during when the traveling wire 300 travels, the die 210, the receiving member 220, the bearing member 230 and the movable member 240 are prevented from moving forward any further. As such, the guide member 250 also serves as a stopper member for the die 210, the receiving member 220, the bearing member 230 and the movable member 240 on the forward side.

The guide surface 251 preferably has a curved shape which is convex toward the forward side in the travel direction of the traveling wire 300. The guide surface 251 having such a curved shape guides the die 210 and the movable member 240 when the travel direction of the traveling wire 300 changes in a vertical direction, and it is effective to control the position and orientation of the die 210 and the movable member 240. As a result, it is possible to control the position and orientation of the die 210 so that the traveling wire 300 can pass through the center of the through-hole 215.

The curved shape of the guide surface 251 is not limited to that described above. The curved shape of the guide surface 251 only needs to be a shape capable of guiding the die 210 so that misalignment between the central axis of the traveling wire 300 and the central axis of the through-hole 215 of the die 210 is reduced when the travel direction of the traveling wire 300 changes, as compared to when the position and orientation of the die 210 are fixed.

Change of the travel direction of the traveling wire 300 in the horizontal-type equipment tents to be greater particularly in the vertical direction. Therefore, in the horizontal-type equipment, a cross-sectional shape of the guide surface 251 within a vertical plane is preferably convex toward the forward side in the travel direction of the traveling wire 300.

The movable member 240 also has a suspending portion 246 for lifting (hanging) the die 210, the receiving member 220, the bearing member 230 and the movable member 240 so that a weight externally applied to the traveling wire 300, i.e., weights of the die 210, the receiving member 220, the bearing member 230 and the movable member 240 are cancelled out.

By connecting a hanging mechanism to the suspending portion 246 so as to cancel out the weights of the die 210, the receiving member 220, the bearing member 230 and the movable member 240 and, if required, also the weight of the coating material spilling over from the die 210 (by lifting up the die 210, the receiving member 220, the bearing member 230 and the movable member 240 so that the traveling wire 300 is less likely to receive the weights of the die 210, the receiving member 220, the bearing member 230 and the movable member 240), it is possible to prevent the aligning force from being inhibited by the weights of the die 210, the receiving member 220, the bearing member 230 and the movable member 240.

An example of the hanging mechanism connected to the suspending portion 246 is a mechanism with a structure in which a mass having the same weight as the die 210, etc., is connected to the suspending portion 246 by a wire-like body via a sheave. Another example of the hanging mechanism connected to the suspending portion 246 is a mechanism with a structure in which the movable member 240 is suspended, via an elastic body such as spring, from a fixed member arranged above the suspending portion 246.

When the impact on the aligning force is negligible, the suspending portion 246 and the hanging mechanism may be omitted.

Second Embodiment

Figure 4:
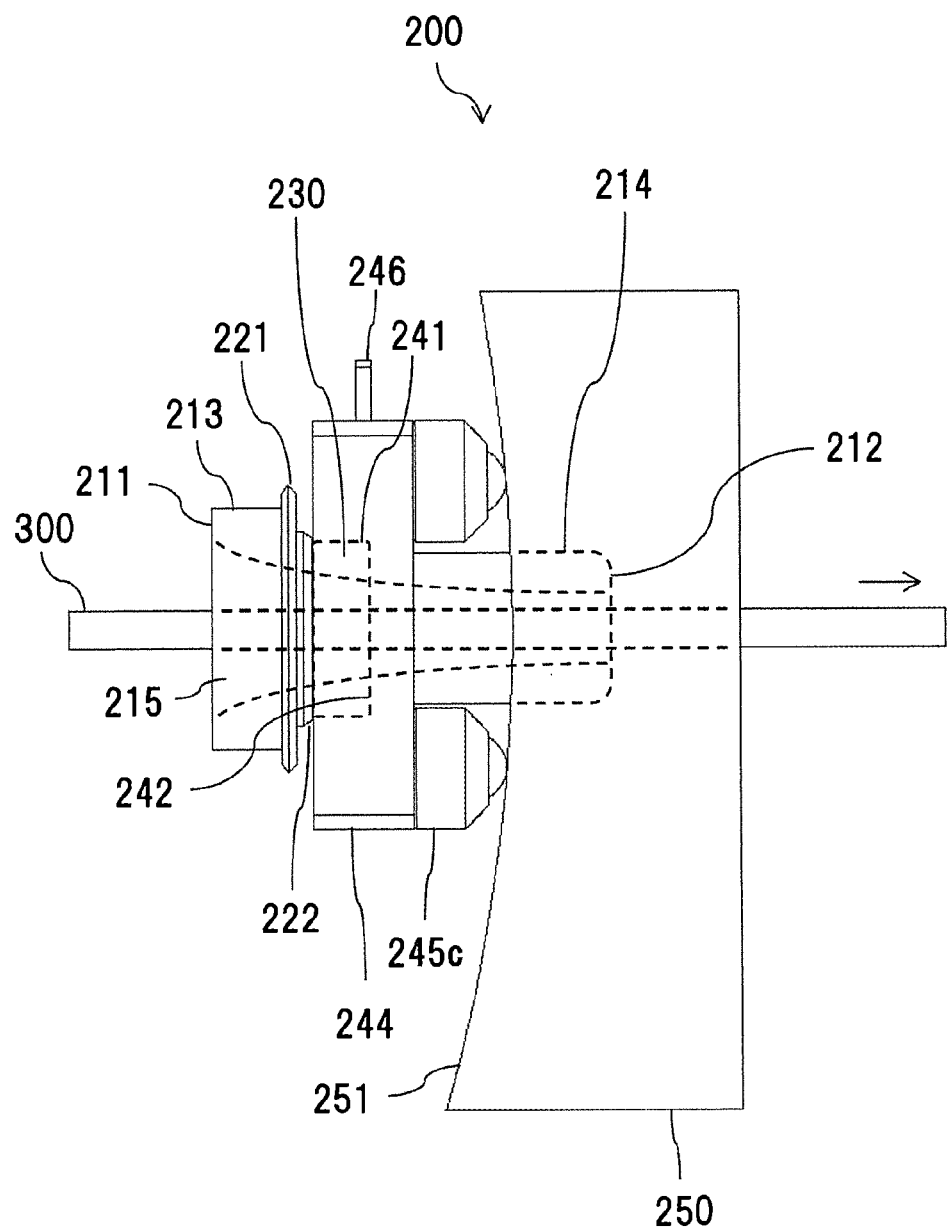
FIG. 4 is a side view showing a configuration of a die with alignment mechanism mounted on the enameled wire manufacturing equipment in the second embodiment.

FIG. 4 is a side view showing a configuration of the die with alignment mechanism 200 mounted on the enameled wire manufacturing equipment in the second embodiment. The die with alignment mechanism 200 shown in FIG. 4 is different from the die with alignment mechanism 200 shown in FIG. 3 only in the structure of the movable member 240. In the following description, members and structures, etc., corresponding those in the first embodiment are denoted by the same reference numerals to simplify the explanation. Hereinafter, the difference from the first embodiment will be mainly described.

In the die with alignment mechanism 200 shown in FIG. 4, the movable member 240 has the movable portion 245 which is formed of ball rollers 245c arranged at positions facing the guide surface 251 of the guide member 250. The movable member 240 is configured that, e.g., plural ball rollers 245c are aligned in a vertical direction, as shown in FIG. 4. The tips of the ball rollers 245c are in contact with the guide surface 251. The die 210 is arranged so that the stem portion 214 is placed between the ball rollers 245c and the other end face 212 of the stem portion 214 is located inside the opening of the guide member 250.

By using the movable portion 245 composed of the ball rollers 245c, the die with alignment mechanism 200 shown in FIG. 4 can control the position and orientation of the die 210 and the movable member 240 to follow the change of the traveling wire 300 in the vertical, horizontal and circumferential directions. As a result, the die with alignment mechanism 200 can control the position and orientation of the die 210 so that the traveling wire 300 passes through the center of the through-hole 215.

Effects of the Embodiments

In the first and second embodiments, by using the die with alignment mechanism 200, it is possible to feed the traveling wire 300 to pass through the center of the through-hole 215 when, e.g., the travel direction of the traveling wire 300 changes inside the coating application unit 120 (it is possible to feed the traveling wire 300 so that misalignment between the central axis of the traveling wire 300 and the central axis of the through-hole 215 is reduced at least as compared to when the position and orientation of the die 210 are fixed).

Although the embodiments of the invention have been described above, the invention is not limited to the above-described embodiments and various modifications can be implemented without departing from the gist of the invention.

For example, although the die with alignment mechanism 200 has been described using an example in which the receiving member 220 is provided as a separate component and arranged between the die 210 and the movable member 240 so as to be in contact with the bearing member 230, it is not limited thereto. A die having the receiving member 220 integrated with the die 210 may be used. A die having the receiving member 220 integrated with the die 210 is, e.g., a die in which a raised portion convex toward the forward side in the travel direction and in contact with the bearing member 230 is provided on the surface of the flange portion 213 of the die 210. In this case, the stem portion 214 is provided on the surface of the raised portion which is provided on the surface of the flange portion 213.

In addition, although the die with alignment mechanism 200 has been described using an example in which the base 221 of the receiving member 220 has a larger outer diameter than the flange portion 213 of the die 210, it is not limited thereto. The flange portion 213 may be configured to have an outer diameter large enough to prevent the excessive coating material removed by the die 210 from flowing from the end face 211 side of the die 210 into the bearing member 230.

As such, in the embodiments of the invention, the die with alignment mechanism 200 having fewer components can be provided without departing from the gist of the invention.

The invention according to claims is not to be limited to the above-mentioned embodiments. Further, please note that all combinations of the features described in the embodiments are not necessary to solve the problem of the invention.

What is claimed is:

1. An enameled wire manufacturing method, comprising: applying a coating material around a traveling wire; and adjusting a thickness of the coating material applied around the traveling wire by using a die with alignment mechanism that comprises a die comprising a through-hole through which a traveling wire travels, a bearing member for rotationally moving the die in a circumferential direction of the traveling wire, and a movable member that moves the die so that a central axis of the through-hole is aligned with a travel direction of the traveling wire without inhibiting the rotational movement of the die produced by the bearing member when the travel direction changes in a direction orthogonal to the travel direction, wherein the movable member comprises a main body and a movable portion, the main body comprising a recessed portion for fitting the bearing member and a hole portion provided on a bottom surface of the recessed portion to allow a portion of the die to penetrate through, and the movable portion being arranged on a forward side of the main body in the travel direction to move the main body in a direction orthogonal to the travel direction of the traveling wire, wherein the die has one end face and another end face opposite thereto and comprises a flange portion including the one end face and a stem portion including the other end face and extending from the flange portion, and the though-hole is provided from the one end face to the other end face, and wherein the die with alignment mechanism further comprises a guide member that is arranged to be in contact with the movable member and comprises a guide surface for guiding the movable member.

2. The enameled wire manufacturing method according to claim 1, wherein the bearing member comprises a bearing portion for rotationally moving the die in the circumferential direction of the traveling wire and has an annular outer shape.

3. The enameled wire manufacturing method according to claim 1, wherein the die with alignment mechanism comprises a receiving member that is arranged between the movable member and the die and comprises a raised portion protruding in the travel direction of the traveling wire and abutting against the bearing member.

4. The enameled wire manufacturing method according to claim 1, wherein the movable portion of the movable member comprises rollers.

5. The enameled wire manufacturing method according to claim 1, wherein the movable portion of the movable member comprises ball rollers.

\* \* \* \* \*